United States Patent Office 3,411,929
Patented Nov. 19, 1968

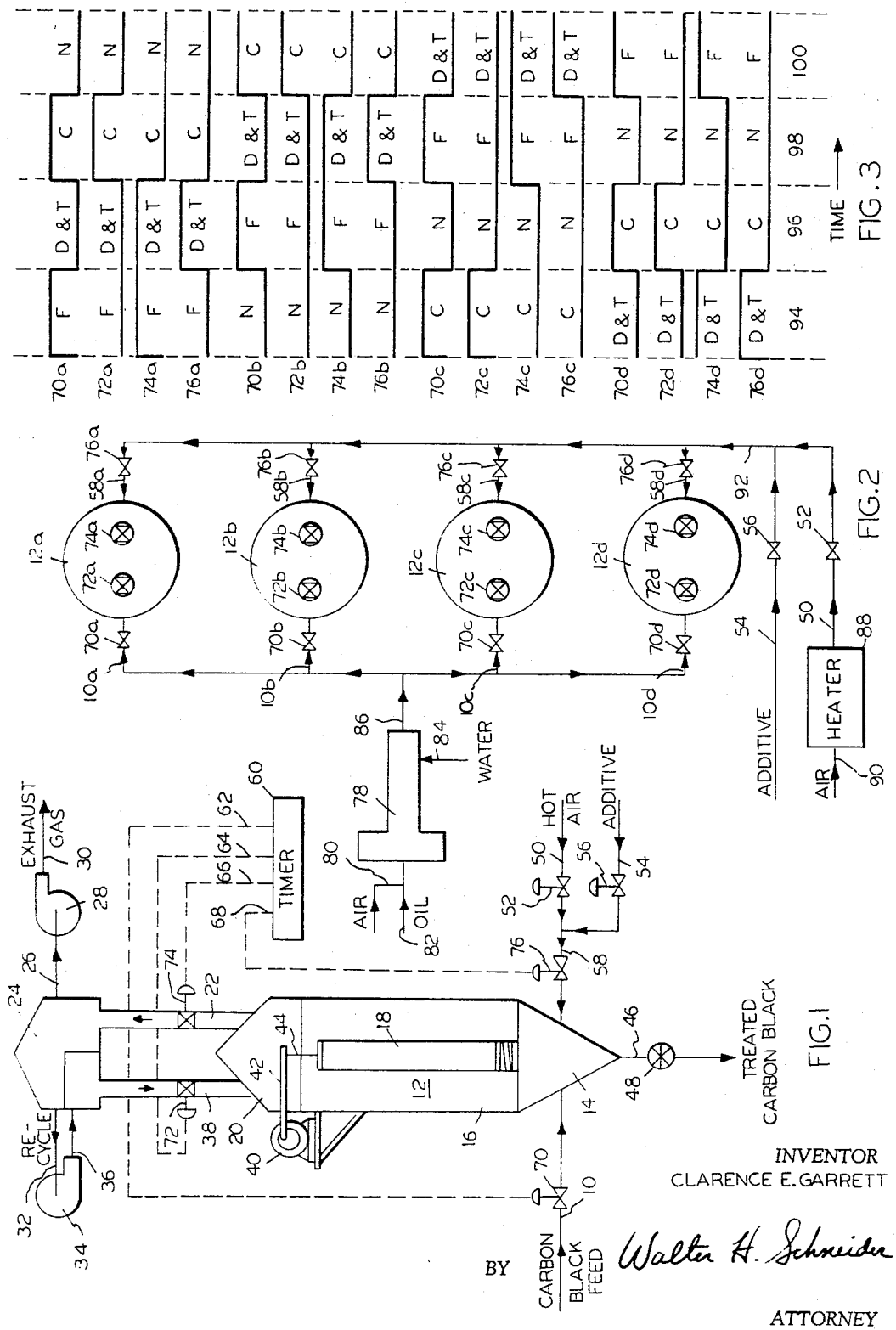

3,411,929
METHOD AND APPARATUS FOR COLLECTING
AND TREATING CARBON BLACK
Clarence E. Garrett, Aransas Pass, Tex., assignor to Ashland Oil & Refining Company, Houston, Tex., a corporation of Kentucky
Filed Jan. 19, 1966, Ser. No. 521,604
20 Claims. (Cl. 106—307)

ABSTRACT OF THE DISCLOSURE

A method and apparatus for collecting carbon black from hot flue gases of a carbon black furnace and treating the carbon black; which includes, passing the combustion products containing the carbon black through a gas permeable filter medium, capable of withstanding substantial differential pressures and of collecting the carbon black particles thereon, to deposit the carbon black on the filter, such as a bag-type carbon black filter; passing a different gas, preferably hot air containing a chemical treating agent, through the filter in the same direction as the combustion products, to thereby dry treat the carbon black; and removing the treated carbon black particles from the filter medium by reversing the flow of gas through the filter medium and/or shaking the filter medium. A plurality of collector-treater units may also be connected serially and operated on a time cycle, including a collection cycle, a drying and treating cycle, a removal cycle and a down cycle, so that at least one of the units is collecting carbon black at all times.

---

The present invention relates to an improved method and apparatus for treating carbon black. In a more specific aspect, the present invention relates to an improved method and apparatus for simultaneously drying and treating carbon black. In a still more specific aspect, the present invention relates to an improved method and apparatus for simultaneously collecting, drying and treating furnace-type carbon black.

In the art of carbon black production there have been two basic processes for the production of carbon black; namely, the channel process and the furnace process. In the channel process, a hydrocarbon gas is burned with less than the stoichiometric amount of oxygen to attain partial combustion of the gas and conversion to carbon black. The hydrocarbon gas flame is caused to impinge upon channels which are cooler than the remaining atmosphere of the chamber and the carbon black formed by the process collects upon these channels. The carbon black is then recovered by scraping the black from the channels and is thereafter sent to storage or further treated. The channel process produces what is known as "impingement carbon black" and is generally considered a high quality product. The impingement carbon black is normally composed of hard dense particles and is considered ideal for use in the manufacture of rubber, ink and other specialty products. In the furnace process, a liquid or gaseous hydrocarbon is fed to a reactor, such as, a tunnel-type reactor, along with a controlled quantity of air. Normally, the feed materials are heated in a relatively large, cross-section combustion section and are then passed to an elongated reaction section where the actual burning and conversion to carbon black predominates. The product of this combustion is a flue gas or product gas containing solid carbon black particles entrained therein. Adjacent the effluent end of the reaction section the stream of effluent is cooled from a temperature between 2000° F. and 3000° F. to between 1000° F. and 1500° F. by quenching with water. The flue gases or product gases from the reactor are then passed to suitable collection equipment where the carbon black particles are separated from the smoke. Usually, such equipment includes some type of cooler followed by an electrical precipitator and several cyclone separators in series. In addition, auxiliary cleanup equipment such as wet scrubbers, bag filters and the like have been employed to remove the last traces of carbon black from the flue gases. While "furnace black" is normally of a lower grade and softer than impingement black, the recent development of low structure furnace blacks and the increasing costs of producing channel blacks or impingement blacks have prompted the use of furnace blacks as substitutes for channel black in the manufacture of rubber, ink and the like. However, these furnace blacks are not direct substitutes for channel blacks and require additional treatment to obtain the same quality and the same properties. One problem in the production of high grade-furnace blacks has been moisture contamination. Heretofore, it has been impossible to produce some kinds of blacks with moisture contents below about 25 percent by weight, whereas, the product should have a moisture content of less than about 1 percent by weight. In addition to drying the furnace blacks, such specialty uses often require that the black be oxidized and/or chemically treated.

One method heretofore utilized to dry, oxidize and/or chemically treat loose furnace black has been by the use of a fluidized bed dryer. However, this technique has not proven satisfactory since it requires the additional step of collecting the carbon black which is thereafter to be treated in the fluidized bed dryer. In addition, fluidized bed type operations are costly both from initial installation standpoint and an operational standpoint. The fluidized bed type dryer also requires a substantial residence time in order to chemically treat the black and is most difficult to control. It has also been found that short circuiting of the loose carbon black results and an inconsistent product is produced, if a continuous rather than a batch process is attempted in the fluidized bed dryer.

It is therefore an object of the present invention to provide an improved method and apparatus for drying carbon black. Another object of the present invention is to provide an improved method and apparatus for simultaneously drying and treating carbon black. Another and further object of the present invention is to provide an improved method and apparatus for simultaneously collecting, drying and treating furnace-type carbon blacks. Yet another object of the present invention is to provide a system for continuously collecting, drying and treating furnace-type carbon blacks. A further object of the present invention is to provide an improved method and apparatus for producing loose furnace blacks suitable for use in the manufacture of rubber, ink and other specialty products. A still further object of the present invention is to provide an effective and economical method and apparatus for producing loose furnace blacks having properties equivalent to channel blacks. Another and further object of the present invention is to provide an improved method and apparatus for collecting, drying and chemically treating loose furnace black in a single treating unit.

These and other objects and advantages of the present invention will be apparent from the following detailed description when read in conjunction with the drawings wherein:

FIGURE 1 shows a detailed flow diagram of a unit of the apparatus of the present invention;

FIGURE 2 shows a flow diagram of a system for continuously carrying out the method of the present invention; and FIGURE 3 graphically illustrates the cyclic operation of the system of FIGURE 2.

Contrary to the prior art it has been surprisingly discovered that loose furnace black can be effectively and economically collected, dried and treated in a single unit by carrying out such collection, drying and treating in a modified bag-type dust collector.

Referring now to FIGURE 1 of the drawings, combustion products or flue gas from a conventional reactor for producing furnace blacks is supplied through line 10, which is designated as the carbon black feed line. This carbon black feed passes to collector-treater chamber 12. Chamber 12 is an apparatus generally known as a bag-type filter. The carbon black feed is fed to a lower plenum chamber or section 14 positioned below a central compartment 16 containing bag-type filters 18. The carbon black feed is drawn into the interior of bags 18 by a suction produced in upper section 20 of the chamber. Bags 18 retain suspended, solid carbon black particles on the inner walls of the bag and permit the gases or smoke to pass into the bag compartment 16, and thence to upper section 20. From upper section 20 of chamber 12 the clean gases pass through duct 22 to upper plenum chamber 24. From plenum chamber 24 the gases are drawn through line 26, into blower 28 and are then exhausted from the apparatus as exhaust gas through line 30. Periodically, the flow of gas through bag filters 18 is stopped and the carbon black deposited in the interior of the bags is removed. Normally, such removal is effected by reversing the flow of clean gas through bag filters 18. This is accomplished by drawing gas from chamber 24 through recycle gas line 32, blower 34 and recycle gas line 36. The recycle gas is then fed to top section 20 of chamber 12 through duct 38. This reverse flow of gases releases the carbon black from the interior of bags 18 from whence it falls into bottom section 14 of chamber 12. The reverse flow of gas to clean bags 18 may be aided by or replaced by a shaking of bags 18. With the flow of exhaust gas through bags 18 stopped, the bags are shaken by shaker means 40, which has connected thereto shaker bar 42. Bags 18 are connected to shaker bar 42 by means of suspension elements 44. Carbon black released from the bag filters is collected in lower section 14 of chamber 12 and may be discharged through line 46 by operating rotary valve 48.

The drying and chemical treatment of the carbon black is effected, while the black is held on the interior surfaces of bags 18, by supplying hot air from an appropriate heater through line 50, which is controlled by valve 52. The treating agent or chemical additive is supplied through line 54, controlled by valve 56. Hot air and additive are mixed and fed to section 14 of chamber 12 through line 58. The operation of the collection, drying and treating cycle is controlled by timer 60, which operates on a predetermined cycle of 4 time-spaced periods. Timer 60 is connected through control lines 62, 64, 66 and 68 to valves 70, 72, 74 and 76, respectively. Valve 70 is mounted in carbon black feed line 10 and thus controls the passage of carbon black feed to chamber 12. Valve 72 is mounted in recycle duct 38 and thereby controls the recycling of clean gas to chamber 12. Valve 74 is mounted in exhaust gas duct 22 to thereby control the passage of clean gas from chamber 12. Valve 76 is mounted in line 58 to thereby control the passage of mixed hot air and additive to chamber 12.

The operation of the apparatus of FIGURE 1 and the method of collecting, drying and treating loose furnace black, in accordance with the present invention, is best illustrated by the apparatus of FIGURE 2, which schematically shows a system for continuously carrying out the method. In accordance with FIGURE 2 air and liquid hydrocarbon oil are fed to a tunnel-type reactor 78 by means of lines 80 and 82, respectively. Quench water is fed to reactor 78 through line 84. Product gases or flue gas from reactor 78 are discharged through line 86. From manifold line 86, carbon black feed is charged to collector-treaters 12a, 12b, 12c and 12d through lines 10a, 10b, 10c and 10d, respectively. Lines 10 are appropriately controlled by valves 70a, 70b, 70c and 70d. Air is fed to heater 88 through line 90. The hot air is discharged from heater 88 through line 50 controlled by valve 52. Additive is supplied through line 54 controlled by valve 56. The mixed hot and additive pass through header line 92 to collector-treaters 12a, 12b, 12c and 12d by means of individual feed lines 58a, 58b, 58c and 58d. Feed lines 58 are controlled by valves 76a, 76b, 76c and 76d. The exhaust gas from chambers 12 is discharged through valves 74a, 74b, 74c and 74d. Recycle gas to the chambers 12 is controlled by valves 72a, 72b, 72c and 72d.

The four basic time periods in the continuous operation of the system of FIGURE 2 are illustrated as time periods 94, 96, 98 and 100 in FIGURE 3 of the drawings. In accordance with FIGURE 3, a maximum of the curve indicates that a valve is open whereas a minimum indicates that the valve is closed. In addition, the letter F designates a filling portion of the cycle, D & T represents a drying and treating portion of the cycle, C represents a cleaning portion of the cycle and N a null portion of the cycle. Referring now to the operation of collector-treater 12a of FIGURE 2, and FIGURE 1 where appropriate, it will be seen that, during the fill portion of the cycle, valve 70a is open, 72a is closed, 74a is open and 76a is closed. Therefore, during this portion of the cycle carbon black feed gas is drawn into bags 18 by means of blower 28. After a predetermined period of time has elapsed, timer 60 operates to close valve 70a, maintain valve 72a closed, maintain valve 74a open and open valve 76a. Accordingly, during this period hot air and additive are drawn through the carbon black particles collected on the inner walls of bags 18 to thereby simultaneously dry the carbon black and chemically treat it. At the end of the predetermined drying and treating portion of the cycle, the treated carbon black is released from bags 18 when timer 60 is operated to open 70a, open 72a, close 74a and close 76a. This reverses the flow of clean gas from plenum chamber 24 to chamber 12, thereby causing carbon collected in bags 18 to drop into section 14 of chamber 12. If desired, the shaker apparatus can also be automatically activated by timer 64 to shake bags 18 during the period of reverse flow of gas. Following the cleaning portion of the cycle, there is a null period during which timer 60 closes valve 70a, closes 72a and maintains valves 74a and 76a closed. Thus, the system is in a quiescent or static condition to permit the carbon black to settle in chamber section 14. It is to be observed from FIGURE 3 that collector-treater 12b is going through the fill portion of the cycle while 12a is going through the drying and treating portion of the cycle. Collector-treater 12c is going through the fill portion of the cycle during the third period when 12a is in the cleaning portion of the cycle. Finally, during the fourth period, or null period for collector-treater 12a, collector-treater 12d is going through the fill portion of the cycle. Accordingly, at all times during the cycle one of the four collector-treaters is being filled so that the operation can be essentially continuous.

Filter bags 18 can be woven from any suitable fabric depending upon the severity of service to which it is to be subjected. A presently preferred type of material for filtering smoke from a carbon black reactor is polyacrylonitrile, a synthetic fiber available on the open market under the registered trademark "Orlon". Glass fiber bags may also be employed but are not presently preferred.

While periods 94, 96, 98 and 100 have been shown in FIGURE 3 as equal periods of time this is not necessarily the case. Actually, the duration of the periods will depend on the type of black being treated, the nature of the filters and the type of treatment. Accordingly, a balanced, continuous operation may require more than four units.

In order to present a specific example of the present invention, reference has been made to bag-type filters. However, it is to be understood that any gas-permeable filter capable of withstanding a differential pressure and adapted to remove fine carbon black particles from a gas can be employed.

The oxidation of the carbon black may be effected by the hot air utilized to dry the black or by adding an oxidizing agent as the additive or together with another additive. Suitable oxidizing agents includes nitrogen oxide, oxygen, ozone, and the like.

It is also to be recognized that the additive may be in any suitable form. Obviously, a gaseous treating agent will come to mind first, but this invention is not so limited. The additive may be a liquid, or even a solid, so long as it can be suspended or otherwise entrained in a carrier gas or vapor and deposited on or dispersed throughout the carbon black held in the filters.

While specific examples and illustrations have been set forth herein, it is to be recognized that certain variations and modifications will occur to one skilled in the art. Therefore, this invention is to be limited only by the appended claims.

I claim:

1. A method of recovering loose carbon black particles from a vaporous medium containing the same and treating said carbon black particles; comprising, passing said vaporous medium containing carbon black through a gas permeable filter medium to deposit said carbon black particles on said filter medium; passing a second vaporous medium including a treating material through the deposited carbon black on the filter medium and the filter medium; and recovering the treated carbon black from the filter medium.

2. A method in accordance with claim 1 wherein the carbon black is furnace-type carbon black.

3. A method in accordance with claim 1 wherein the carbon black is deposited by passing effluent from a carbon black furnace through the filter medium.

4. A method in accordance with claim 1 wherein the gas-permeable filter is a fabric formed from polyacrylonitrile.

5. A method in accordance with claim 1 wherein the filter medium is a vertically-disposed, elongated, tubular bag having a closed upper end and an open lower end and the carbon black is deposited on the interior walls of said bag by maintaining a pressure on the exterior of said bag which is lower than the pressure in the interior of said bag.

6. A method in accordance with claim 1 wherein the vaporous medium carrying the treating material is heated.

7. A method in accordance with claim 1 wherein the vaporous medium carrying the treating material is hot air.

8. A method in accordance with claim 1 wherein the treated carbon black is removed from the filter medium by reversing the flow of vaporous medium through the filter medium.

9. A method in accordance with claim 1 wherein the carbon black is deposited by passing effluent from a carbon black furnace through the filter medium for a first predetermined period of time, the vaporous medium containing a treating material is hot air and is passed through said filter medium in the same direction as said effluent from said carbon black furnace for a second predetermined period of time, the treated carbon black is removed from said filter medium by reversing the direction of flow of said vaporous medium through said filter medium for a third predetermined period of time, and said filter medium is then maintained in a static atmosphere for a fourth predetermined period of time.

10. A method in accordance with claim 9 wherein a plurality of unit operations utilizing the four predetermined time periods are simultaneously carried out in staged relationship so that carbon black is being deposited in at least one of said unit operations at all times.

11. Apparatus for treating loose carbon black particles; comprising, a gas-permeable filter means; carbon black inlet means communicating with one side of said filter means; carbon black valve means in said carbon black inlet; treating material inlet means communicating with said one side of said filter means; treating material valve means in said treating material inlet; exhaust vapor outlet means communicating with the other side of said filter means; exhaust vapor valve means in said exhaust vapor outlet; and sequence timer means operatively connected to said carbon black, said treating material and said exhaust gas valves to open and close said valves on a predetermined time cycle.

12. Apparatus in accordance with claim 11 which additionally includes recycle vapor inlet means in communication with the other side of the filter means and recycle gas valve means, in said recycle vapor inlet, operatively connected to the sequence timer.

13. Apparatus in accordance with claim 12 wherein the exhaust gas outlet is associated with a suction means to draw exhaust gas through said exhaust gas outlet.

14. Apparatus in accordance with claim 12 wherein the recycle gas inlet and the exhaust gas outlet are associated with blower means to recycle exhaust gas from said exhaust gas outlet to said recycle gas inlet.

15. Apparatus in accordance with claim 12 wherein a plurality of filter means and combined elements are connected to a single source of carbon black and the timer is operatively connected to the respective valves of each unit to admit carbon black to at least one of said filter means at all times.

16. Apparatus in accordance with claim 11 wherein the filter means is a bag-type filter means.

17. Apparatus in accordance with claim 11 wherein the carbon black inlet means is connected to the outlet end of a carbon black furnace.

18. Apparatus in accordance with claim 17 wherein the carbon black furnace is a tunnel-type furnace.

19. Apparatus in accordance with claim 11 wherein the treating material inlet means is connected to a heater.

20. Apparatus in accordance with claim 19 wherein the treating material inlet means is connected to an additive inlet means and a hot air inlet means.

References Cited

UNITED STATES PATETNS

| 2,623,811 | 12/1952 | Williams | 23—209.6 |
| 2,984,547 | 5/1961 | Antonsen | 23—209.1 |
| 3,155,325 | 11/1964 | Austin | 23—209.9 X |
| 3,187,487 | 6/1965 | Loewen | 55—341 |
| 3,216,843 | 11/1965 | Heller et al. | 106—307 |

EDWARD J. MEROS, *Primary Examiner.*